United States Patent [19]

Foster

[11] Patent Number: 4,940,132
[45] Date of Patent: Jul. 10, 1990

[54] SEALS FOR RECIPROCATING CONVEYOR FLOOR MEMBERS

[76] Inventor: Raymond K. Foster, P.O. Box 1, Madras, Oreg. 97741

[21] Appl. No.: 346,784

[22] Filed: May 3, 1989

Related U.S. Application Data

[60] Continuation-in-part of Ser. No. 185,840, Apr. 25, 1988, Pat. No. 4,858,748, which is a division of Ser. No. 59,376, Jun. 4, 1987, Pat. No. 4,785,929, which is a continuation-in-part of Ser. No. 680,069, Dec. 10, 1984, Pat. No. 4,679,686, which is a continuation-in-part of Ser. No. 346,865, Feb. 8, 1982, Pat. No. 4,492,303.

[51] Int. Cl.⁵ .............................................. B65G 25/00
[52] U.S. Cl. ................................... 198/750; 414/525.1
[58] Field of Search ........................ 198/750; 414/525.1, 414/525.9

[56] References Cited

U.S. PATENT DOCUMENTS

| | | | |
|---|---|---|---|
| 3,534,875 | 10/1970 | Hallstrom, Jr. | 214/83.3 |
| 4,144,963 | 3/1979 | Hallstrom | 198/750 |
| 4,184,587 | 1/1980 | Hallstrom | 198/750 |
| 4,492,303 | 1/1985 | Foster | 198/750 |
| 4,679,686 | 7/1987 | Foster | 198/750 |
| 4,727,978 | 3/1988 | Hallstrom, Jr. | 198/737 |
| 4,785,929 | 11/1988 | Foster | 414/525.1 X |

Primary Examiner—Robert J. Spar
Assistant Examiner—D. Glenn Dayoan
Attorney, Agent, or Firm—Glenn D. Bellamy

[57] ABSTRACT

A reciprocating floor conveyor comprises a plurality of adjacent elongated floor members (10). Each floor member has first and second sides (14, 16), each of which may include a longitudinal dovetail groove (24, 56). A first resiliently bendable elongated elastomeric seal (26) is provided for each floor member (10). The first seal (26) has an inboard base portion (28, 50) captured within the first side's dovetail groove (24) and an outboard portion which includes a branch strip (52) extending from the inboard portion (28, 50). The branch strip has a free edge (44, 54) positioned to contact a confronting surface (16) of an adjacent floor member (10) and has a stiff resiliency urging its free edge (44, 54) toward the confronting surface (16). A second bendable elongated elastomeric seal (58) may be provided. The second seal (58) has a retaining base portion (60) formed at a first edge thereof and extends generally upwardly therefrom to a second outer edge (68). The retaining base (60) is shaped to be engaged within the second side's dovetail groove (56) such that the second seal (58) is bendable from a position where it is extending generally outwardly from the second side (16) to a position substantially parallel to and adjacent the second side (16). The outer edge (68) is positioned to contact a confronting surface (14) of an adjacent floor member (10) above a dovetail groove (24) formed in the adjacent floor member's first side (14).

12 Claims, 4 Drawing Sheets

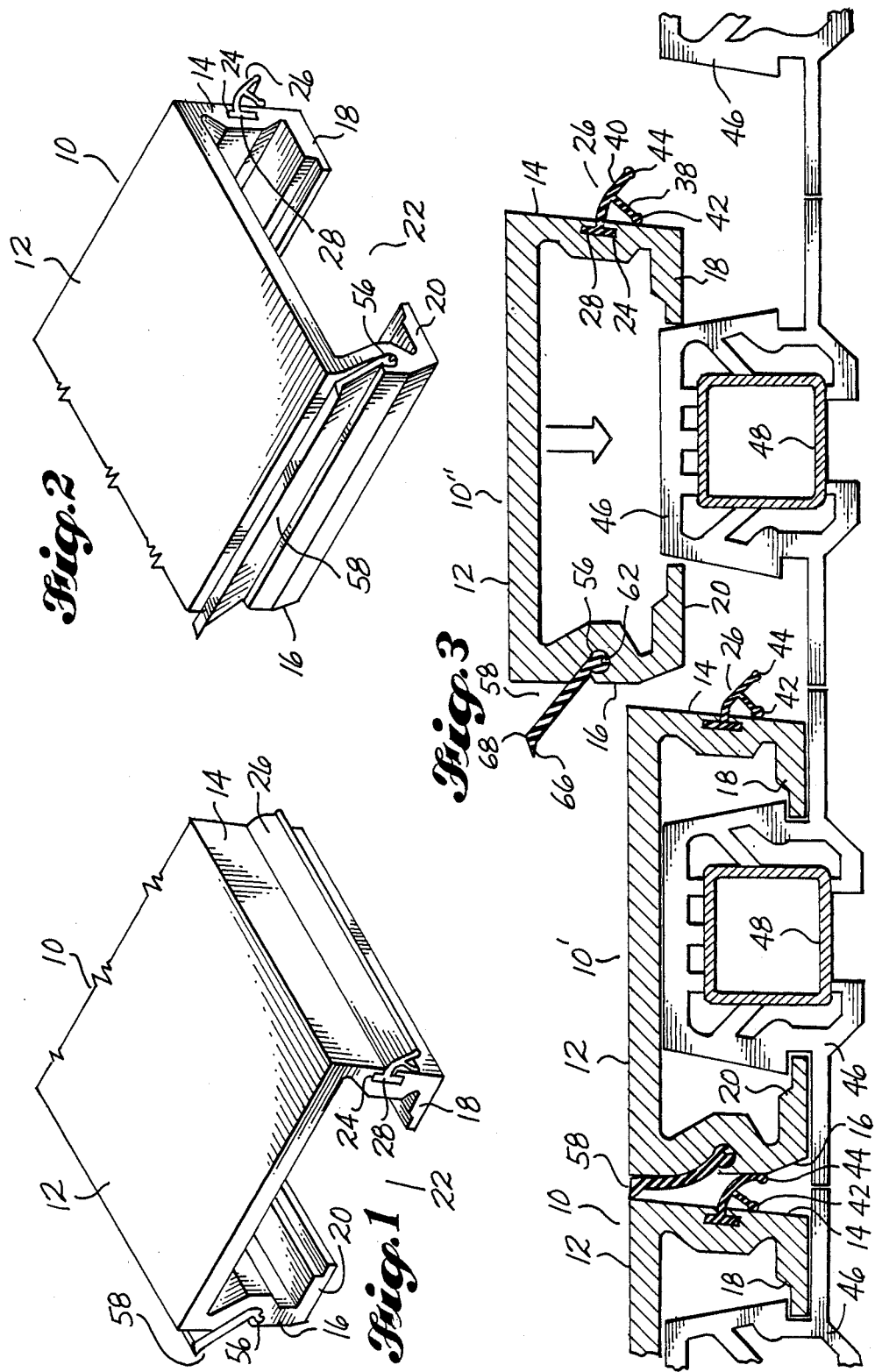

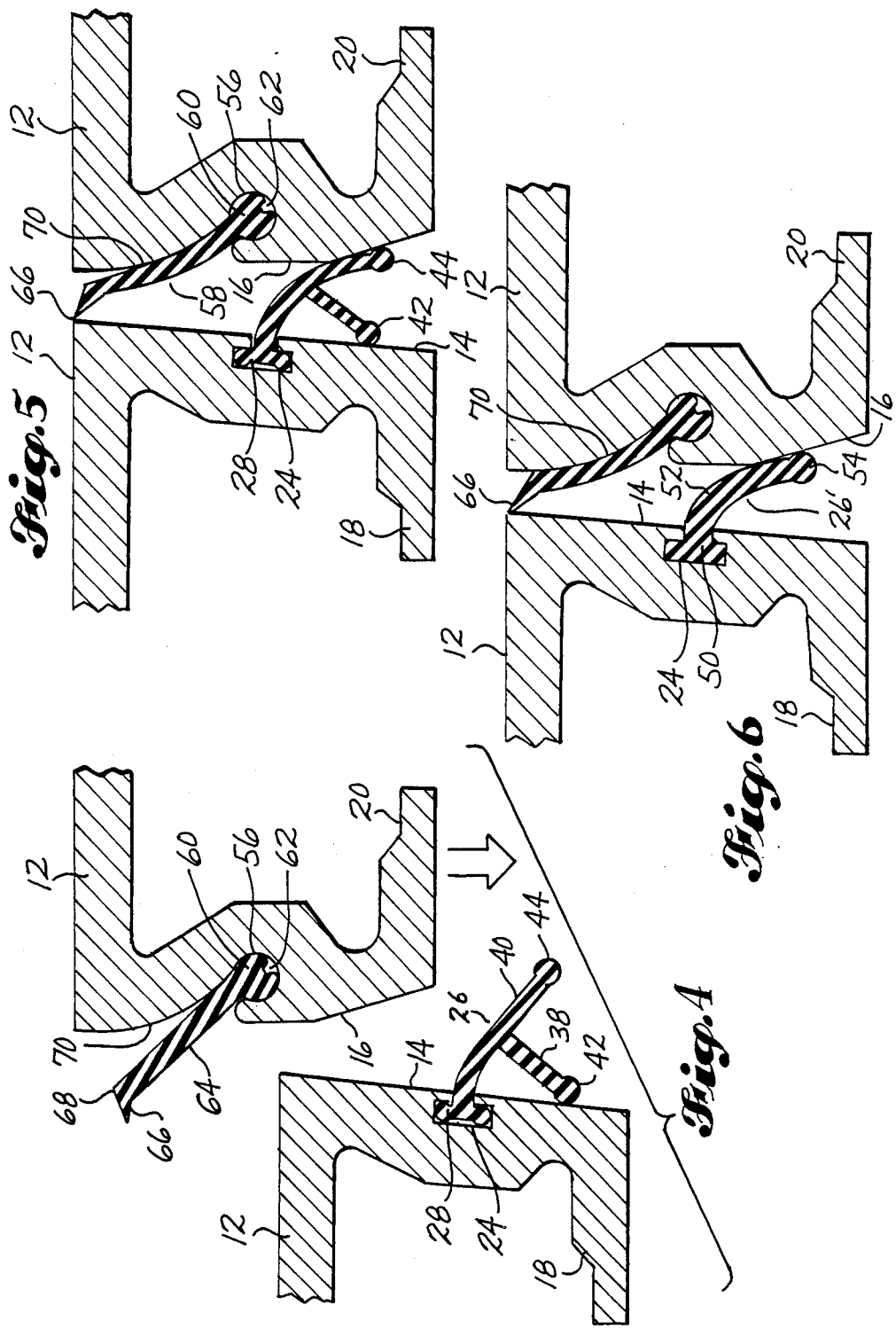

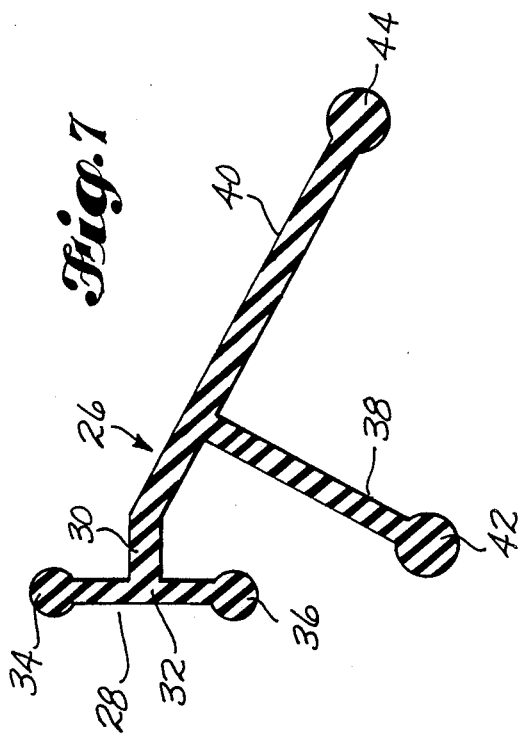
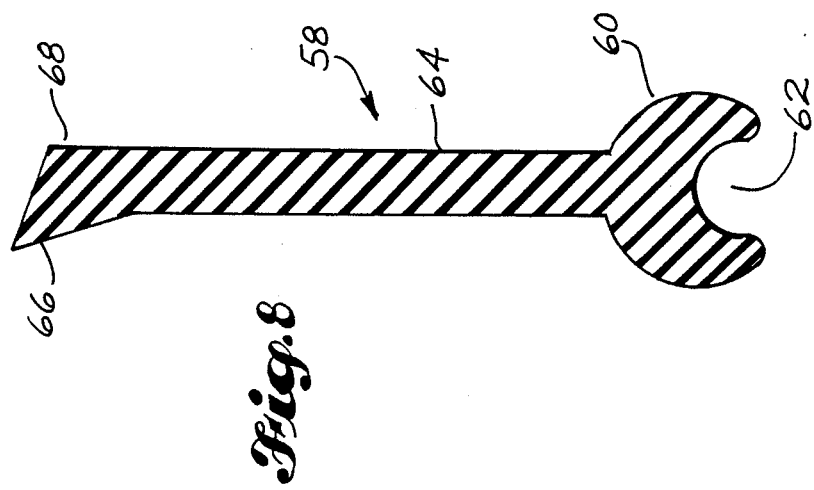

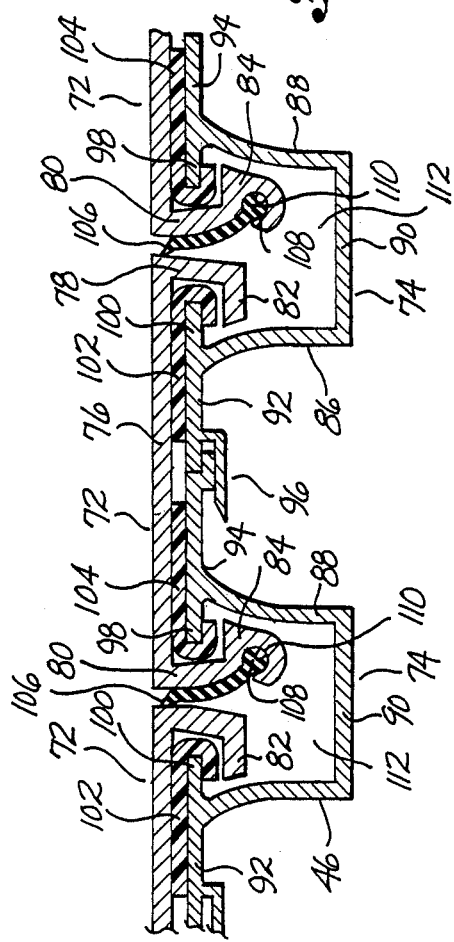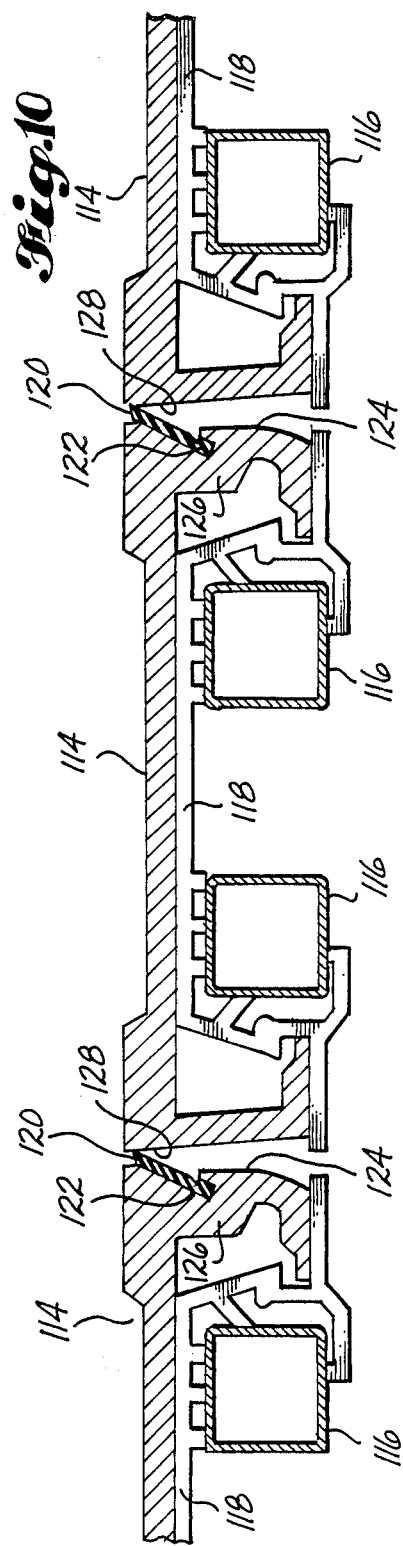

SEALS FOR RECIPROCATING CONVEYOR FLOOR MEMBERS

RELATED APPLICATIONS

This application is a continuation-in-part of my co-pending application Ser. No. 07/185,840, filed Apr. 25, 1988 and now U.S. Pat. No. 4,858,748, which is a division of my Ser. No. 07/059,376 filed June 4, 1987 now U.S. Pat. No. 4,785,929, issued Nov. 22, 1988, and a continuation-in-part of my Ser. No. 06/680,069 filed Dec. 10, 1984 now U.S. Pat. No. 4,679,686, issued July 14, 1987, which is a continuation-in-part of my Ser. No. 06/346,865 filed Feb. 8, 1982 now U.S. Pat. No. 4,492,303, issued Jan. 8, 1985.

TECHNICAL FIELD

This invention relates to reciprocating floor conveyors, and in particular to the provision of seals between floor members to prevent seepage of liquid and other debris upwardly and/or downwardly through the reciprocating conveyor between floor members.

Background Art

Simple seal strips between adjacent floor members of a reciprocating floor conveyor have been well known and in use for many years. U.S. Pat. No. 4,144,963, issued to Olaf A. Hallstrom Mar. 20, 1979, discloses an elongated strip of flexible material secured removably to one side of each floor member by forming the strip with a laterally projecting dove-tail section and providing a corresponding vertical sidewall of a floor member with a matching dove-tail groove. A thin upper lip or fin portion of the strip extends angularly upward and outward to contact the confronting vertical side of an adjacent floor member near its upper edge. A similarly-constructed seal is disclosed in U.S. Pat. No. 4,184,587, issued Jan. 22, 1980 and in my U.S. Pat. No. 4,492,303, issued Jan. 8, 1985.

Such seals are somewhat effective at preventing liquids or debris from the load above the conveyor from seeping downwardly between the floor members when these seals are new and intact. Because the seals are relatively thin and bridge the gap between floor members only with a short extended fin, these seals are subject to damage and wear, thereby limiting their useful life. Also, due to their upwardly-projecting orientation, they may not be effective in sealing upward splash of liquids or road spray from below the conveyor. Because these reciprocating conveyors are commonly installed as floors in semi-trailors, the underside of the conveyor may be subjected to a substantial amount of road spray or splashed mud from below. This underspray is often of an amount sufficient to cause water damage or contamination to the cargo or load carried on the reciprocating floor conveyor.

DISCLOSURE OF THE INVENTION

The present invention provides upper and/or lower seals between adjacent floor members for a reciprocating floor conveyor. Such floor members include a pair of opposite sides.

In the instance of a lower seal alone, a longitudinal dovetail groove is formed along a first side of each floor member. A resiliently bendable elastomeric seal is provided for each floor member. The seal has an inboard base portion captured within the dovetail groove and has an outboard portion which includes a branch strip extending from the inboard portion. The branch strip has a free edge positioned to contact a confronting surface of an adjacent floor member. The branch strip has a stiff resiliency urging its free edge toward the confronting surface which it contacts.

In the instance of an upper seal alone, a dovetail groove is formed along a second side of each floor member. An elastomeric seal which has a retaining base formed along a first edge thereof is provided. The seal extends generally upwardly from the retaining base to a second outer edge. The retaining base is engaged within the retaining groove such that the seal is bendable from a position where the seal is extending generally outwardly from the side of floor member to a position substantially parallel to and adjacent the side of the floor member. The outer edge is positioned to contact a confronting surface of an adjacent floor member.

In the instance of both upper and lower seals, the above-described seals are provided on opposite sides of each floor member such that between adjacent floor members, the outer edge of the upper seal is positioned to contact a confronting surface of an adjacent floor member above the first side's dovetail groove of the adjacent floor member and the lower seal's branch strip contacts the confronting surface of the adjacent floor member below the second side's dovetail groove.

In this manner, the reciprocating floor conveyor can be made substantially nonporous to liquids seeping and debris sifting from the load above the floor members. Cargo carried above the floor is effectively shielded from road spray and splashing from below the floor. Other more detailed features of the invention are shown in the various figures of the drawing, described in the description of the preferred embodiment, and particularly pointed out in the appended claims.

BRIEF DESCRIPTION OF THE DRAWINGS

In the drawings, like element designations refer to like parts throughout, and

FIG. 1 is a fragmentary pictorial view of a floor member according to a preferred embodiment of the invention;

FIG. 2 is another fragmentary pictorial view of the floor member shown in FIG. 1;

FIG. 3 is a cross-sectional view of a plurality of adjacent floor members constructed according to a preferred embodiment of the invention;

FIG. 4 is a fragmentary cross-sectional view of adjacent floor members, one of which is being moved downwardly into place;

FIG. 5 is an enlarged fragmentary cross-sectional view of seals between adjacent floor members;

FIG. 6 is a fragmentary cross-sectional view of a second preferred embodiment of seals between adjacent floor members.

FIG. 7 is a cross-sectional detailed view of a first seal;

FIG. 8 is a cross-sectional detailed view of a second seal;

FIG. 9 is a cross-sectional view of a plurality of adjacent floor members constructed according to one alternate embodiment; and FIG. 10 is a cross-sectional view of a plurality of adjacent floor members constructed according to another alternate embodiment.

BEST MODE FOR CARRYING OUT THE INVENTION

My U.S. Pat. No. 4,821,868, issued Apr. 18, 1989, and entitled, "Drive/Frame Assembly for a Reciprocating Floor," discloses a presently preferred embodiment of a reciprocating floor conveyor. My U.S. Pat. No. 4,492,303, issued Jan. 8, 1985, and entitled, "Drive/Guide System for a Reciprocating Floor Conveyor," discloses a preferred support and guide frame construction for floor members. Longitudinal floor members are connected to transverse drive beams which reciprocate back and forth longitudinally of the floor within a relatively small space. Transverse support beams for the floor members are positioned on both sides of this space. The longitudinal guide members are supported on and connected to transverse support beams. Plastic slide bearings are secured to the guide beams at locations where the guide beams set down on the transverse support beams. My U.S. Pat. No. 4,679,686, issued July 14, 1987, and entitled, "Bearing System for Reciprocating Floor Conveyor," discloses plastic slide bearings which are constructed to be snapped into place on the longitudinal guide beams and which are constructed to allow the floor members to be snapped into place from above. The contents of U.S. Pat. No. 4,821,868, U.S. Pat. No. 4,492,303 and U.S. Pat No. 4,679,686 are hereby expressly incorporated into this application by this specific reference.

As disclosed in the above-referenced patents and application, the floor members of a reciprocating floor conveyor are moved in one direction to advance a load, and are retracted in the opposite direction. Each discloses a reciprocating floor conveyor in which the floor members are divided into three sets. All of the floor members are moved in the first direction to advance the load. They are retracted one set at a time until all floor members are at a start position. The operation is then repeated.

These features of a reciprocating floor conveyor are well known. The present invention provides a series of more durable seals positioned between the floor members to make the floor effectively non-porous and to prevent road spray or splashed mud from contaminating the load carried on the floor.

Referring to the several FIGURES of the drawing and first to FIGS. 1 and 2, therein is shown a portion of a longitudinal floor member 10 according to the preferred embodiment of the invention. Each floor member 10 includes a top panel 12, a pair of opposite, downwardly extending sides 14, 16, and a pair of opposite, inwardly directed flange portions 18, 20 which define a space 22 therebetween.

The first side 14 includes an outwardly-opening, longitudinal dovetail groove 24. This groove may be of any suitable configuration which includes a constricted opening to a larger interior portion. The illustrated embodiment has a dovetail groove 24 substantially in the shape of a "T". A first resiliently-bendable elongated elastomeric seal 26 is provided for each floor member 10. The seal 26 has an inboard base portion 28 which is shaped to be captured within the dovetail groove 24.

Referring to FIG. 7, the inboard retaining portion 28 includes a constricted stem portion 30 and an enlarged flange portion 32. The flange portion 32 is shaped to substantially conform with the interior shape of the longitudinal retaining groove 24. In preferred form, the flange portion 32 is bounded at opposite edges by enlarged portions 34, 36. A retaining base portion 28 of this shape is more easily slid into the dovetail retaining groove 24 than one having squared edges and uniform thickness. The enlarged end portions 34, 36 allow the seal 26 to fit snuggly within the groove 24 but provide minimal frictional contact with the interior of the groove 24 as the retaining base 28 is slid into the groove. This feature is important in embodiments where each floor member 10 and seal 26 are forty feet or more in length.

The seal 26 also includes an outboard portion with first and second branch strips 38, 40 which extend from the inboard portion 28. The first branch strip 38 has an enlarged free edge portion 42 which is positioned to contact the first side 14 of the floor member 10 below the dovetail groove 24.

The second branch strip 40 has an enlarged free edge portion 44 which is positioned to contact a confronting surface of an adjacent floor member's second side 16. Each branch strip 38, 40 has a stiff resiliency which urges its free edge 42, 44 toward the respective surface contacted by each edge 42, 44. The seal 26 is shown in an unloaded condition in FIGS. 3, 4 and 7. The seal 26 is shown in a loaded position in FIGS. 3 and 5. The downwardly-directed position of each branch strip 38, 40 allows the floor members 10 to be downwardly snapped into place successively, as shown in FIG. 3. A first floor member 10' is shown snapped into place on a bearing 46 which is supported on a longitudinal support beam 48. The first floor member 10' has its first side 14 and seal strip 26 outwardly exposed to be adjacent the next floor member 10". An alternative embodiment of this seal strip 26' is shown in FIG. 6. The seal strip 26' includes an inboard retaining base portion 50 and an outboard branch strip 52. The free edge of the branch strip 52 includes an enlarged portion 54 which is positioned to contact the second side 16 of an adjacent floor member.

According to another aspect of the invention, each floor member 10 may include a second longitudinal dovetail groove 56 formed longitudinally along the outer surface of the second side 16. A second resiliently-bendable elongated elastomeric seal 58 is provided for each floor member 10 and has a retaining base portion 60 formed along one edge thereof. The dovetail groove 56 may be of any suitable shape or design which includes an enlarged inward area with a constricted opening. The preferred embodiment, shown for example in FIG. 4, has a substantially circular cross-section with an upwardly and outwardly directed opening.

The base portion 60 has a cross-section shaped to conform substantially with that of the dovetail groove 56. In preferred form, the retaining base portion 60 includes a flute or notch 62 formed along the length thereof. This flute 62 allows the base portion 60 to be compressed slightly in cross-section as necessary to be easily slid into place along the dovetail groove 56.

Extending from the base portion 60 is the strip body 64 which has an enlarged lip portion 66 adjacent its free edge 68. In an unloaded condition, the strip body 64 is substantially straight, as shown in FIGS. 4 and 8. When the floor member 10 is moved into position adjacent another floor member 10, the body portion 64 of the seal 58 bends inwardly to conform with and become substantially parallel to an upper curved portion 70 of the second side 16. FIG. 3 illustrates the relative positions of the seal 58 in both the installed and uninstalled conditions. FIGS. 4 and 5 detail the relative positions of the strip 58 between adjacent floor members 10. In the installed or "loaded" position, the seal 58 has sufficient resiliency to urge the lip portion 66 of the free end 68 into contact with the first side 14 of an adjacent floor member 10. The curved shape of the upper portion 70 of the side 16 causes the seal 58 to remain in the "loaded" position even as the lip portion 66 wears or as lateral shifting or "play" of the floor members 10 causes the spacing between the floor members to vary. The free edges 42, 44, 66 will remain in contact with an adjacent floor member even during such lateral movement.

In preferred form, the first and second seals 26, 58 are used in conjunction. The relative position of each seal 26, 58 on each side 14, 16 allows the floor members 10, 10', 10" to be snapped successively downwardly into place, as illustrated in FIG. 3. As detailed in FIG. 5, the free edge 44 of the first seal 26 is urged into contact with the second side 16 of the adjacent floor member below the dovetail groove 56. The lip portion 66 of the second seal 58 is urged into contact with the first side 14 of an adjacent floor member above its dovetail groove 24. The seals 26, 58 may be used separately or in combination as desired.

In combination, the seals 26, 58 make the floor of the reciprocating conveyor effectively non-porous. The first seal 26 prevents road spray and mud splashed from beneath the conveyor from seeping upwardly between floor members 10 to damage or contaminate a load carried on the conveyor. The second seal 58 prevents downward seeping or sifting of debris from a load carried on the conveyor. Because the seal 58 has a substantial thickness at its free end 68, the seal is long-wearing and resists damage caused by grit and abrasive particles from the load. If the seal 58 wears, the free end 68 is maintained in contact with the first side 14 of the adjacent floor member 10 regardless of the amount of lateral shift or "play" between floor members 10. Due to the shape and position of the seal 58, downward pressure or packing from the load urges the seal's free end 68 into even tighter contact with the adjacent floor member 10.

An alternative embodiment is illustrated in FIG. 9. In this embodiment, adjacent floor members 72 are supported on adjacent support members 74. Each floor member 72 includes a top panel 76, downwardly-extending sides 78, 80, and opposite inwardly-extending flange portions 82, 84. Each support member 74 includes substantially vertical sidewalls 86, 88 interconnected at lower edges by an intermediate web portion 90. Extending in opposite directions from upper edges of the sidewalls 86, 88 are support panels 92, 94. A first support panel 92 is interconnected (at 96) to a second support panel 94 of an adjacent support member 74. The top support panels 92, 94 of adjacent support members 74 support a single floor member 72. The flange portions 82, 84 of each floor member 72 extend beneath flange portions 98, 100 of each support member 74. A friction-reducing bearing 102, 104 may be interposed between the floor members 72 and support members 74. Positioned between each floor member 72 is a seal 106 substantially identical to that described above. Each seal 106 has a retaining base portion 108 which fits within a longitudinal dovetail groove 110 formed beneath a flange portion 84 of each floor member 72. The curvature of the sidewall 80 causes the seal 106 to be maintained in a loaded position and resiliently urged into contact with the sidewall 78 of an adjacent floor member 72. Beneath each seal 106 is an open space 108 defined between the sidewalls 86, 88 and interconnecting web 90. Because the interconnecting web 90 completely seals the bottom of the space 112, a lower seal, such as described above and shown at 26, is unnecessary.

Yet another alternative embodiment is illustrated in FIG. 10. Each widened floor member 114 is mounted on a pair of adjacent longitudinal support beams 116 with a friction-reducing bearing 118 interposed therebetween. An elongated elastomeric seal member 120 is associated with each floor member 114. The seal 120 has an enlarged retaining base portion 122 which is shaped to fit within a dovetail retaining groove 124 formed along the outer surface of a sidewall 126. In this embodiment, the retaining base portion 122 is substantially square in cross-section and the seal 120 extends upwardly and outwardly therefrom such that a free edge is maintained in contact with a confronting surface 128 of an adjacent floor member 114. As described above, the seal 120 has sufficient inherent resiliency to be biased into a sealing position and is further urged by any "packing" from the load carried above the floor. This seal is disclosed by illustration, but not described, in my co-pending application Ser. No. 07/185,840, filed Apr. 25, 1988, now 4,858,748 and entitled, "Bearing System for Reciprocating Floor Conveyor."

Of course, many variations may be made in the form or position of the seals of this invention without departing from its spirit and scope. For example, the seals may be used separately or in combination, as required by any particular application. The above-described and illustrated embodiments are the presently-preferred and best known mode for carrying out the invention, however, these embodiments are for example only and are not intended to be limitive. It will be apparent to those skilled in the art that various changes may be made in the size, shape, type, number and arrangement of parts described hereinbefore. Therefore, my patent protection is to be limited and defined only by the following claim or claims, as interpreted in accordance with the doctrine of equivalents.

What is claimed:

1. A reciprocating floor conveyor, comprising:
   a plurality of adjacent elongated floor members, each floor member having first and second sides, said first side of each floor member including a longitudinal dovetail groove; and
   a resiliently bendable elongated elastomeric seal for each floor member, said seal having an inboard base portion captured within the dovetail groove and an outboard portion, said outboard portion including a branch strip outwardly and downwardly extending from said inboard portion, said branch strip having a free edge positioned to contiguously contact a confronting surface of an adjacent floor member such that said reciprocating floor conveyor is substantially nonporous to upward movement of material between said adjacent floor members and having a stiff resiliency urging said free edge toward the confronting surface.

2. The reciprocating floor conveyor according to claim 1, wherein said outboard portion further includes a second branch strip extending from said inboard portion, said second branch strip having a free edge in contact with the first side of its floor member below the dovetail groove and having a stiff resiliency urging its free edge toward said first side.

3. The reciprocating floor conveyor according to claim 1, wherein each of said adjacent elongated floor members is operably mounted on a support which permits each floor member to be installed by a downward movement.

4. A reciprocating floor conveyor comprising:
a plurality of longitudinally extending, adjacent elongated floor members, each floor member having first and second sides, said second side of each floor member including a longitudinal dovetail groove; and
a resiliently bendable elongated elastomeric seal for each floor member, said seal having a retaining base at a first edge thereof, and said seal in an unloaded condition extending laterally from said retaining base substantially along a straight line to an outwardly-spaced second edge,
said retaining base being shaped to be engaged within said dovetail groove such that said seal is bendable from a position wherein said seal extends generally outwardly from the second side to a position substantially parallel to and adjacent said second side, and wherein said second edge is positioned to contact a confronting surface of an adjacent floor member.

5. The reciprocating floor conveyor according to claim 4, wherein each of said adjacent elongated floor members is operably mounted on a support which permits each floor member to be installed by a downward, movement.

6. A reciprocating floor conveyor, comprising:
a plurality of adjacent elongated floor members, each floor member having first and second sides, said second side of each floor member including a longitudinal dovetail groove; and
a resiliently bendable elongated elastomeric seal for each floor member, said seal having a retaining base at a first edge thereof and said seal extending generally upwardly from said retaining base to a second outer edge,
said retaining base being shaped to be engaged within said dovetail groove such that said seal is bendable from a position wherein said seal extends generally outwardly from the second side to a position substantially parallel to and adjacent said second side, wherein said outer edge is positioned to contact a confronting surface of an adjacent floor member, and wherein said second side includes a longitudinally straight vertically convex side surface located vertically above said dovetail groove.

7. A reciprocating floor conveyor, comprising:
a plurality of adjacent elongated floor members, each floor member having first and second sides, said first and second sides each including a longitudinal dovetail groove;
a first resiliently bendable elongated elastomeric seal for each floor member, said first seal having an inboard base portion captured within the first side's dovetail groove and an outboard portion, said outboard portion including a branch strip extending from said inboard portion, said branch strip having a free edge positioned to contact a confronting surface of an adjacent floor member and having a stiff resiliency urging said free edge toward the confronting surface; and
a second resiliently bendable elongated elastomeric seal having a retaining base formed at a first edge thereof and said second seal extending generally upwardly from said retaining base to a second outer edge, said retaining base being shaped to be engaged within said second side's dovetail groove such that said second seal is bendable from a position wherein said second seal is extending generally outwardly from said second side to a position substantially parallel to and adjacent said second side, and wherein said outer edge is positioned to contact a confronting surface of an adjacent floor member above a dovetail groove formed in a first side of said adjacent floor member.

8. The reciprocating floor conveyor according to claim 7, wherein said second side includes a longitudinally straight vertically convex side surface located vertically above said second side's dovetail groove.

9. The reciprocating floor conveyor according to claim 7, wherein each of said adjacent elongated floor members is operably mounted on a support which permits each floor member to be installed by a downward movement.

10. The reciprocating floor conveyor according to claim 7, wherein said outboard portion further includes a second branch strip extending from said inboard portion, said second branch strip having a free edge in contact with the first side of its floor member below the first side's dovetail groove and having a stiff resiliency urging its free edge toward said first side.

11. The reciprocating floor conveyor according to claim 10, wherein said second side includes a longitudinally straight vertically convex side surface located vertically above said second side's dovetail groove.

12. The reciprocating floor conveyor according to claim 11, wherein each of said adjacent elongated floor members is operatively mounted on a support which permits each floor member to be installed by a downward movement.

* * * * *